Figure 1:
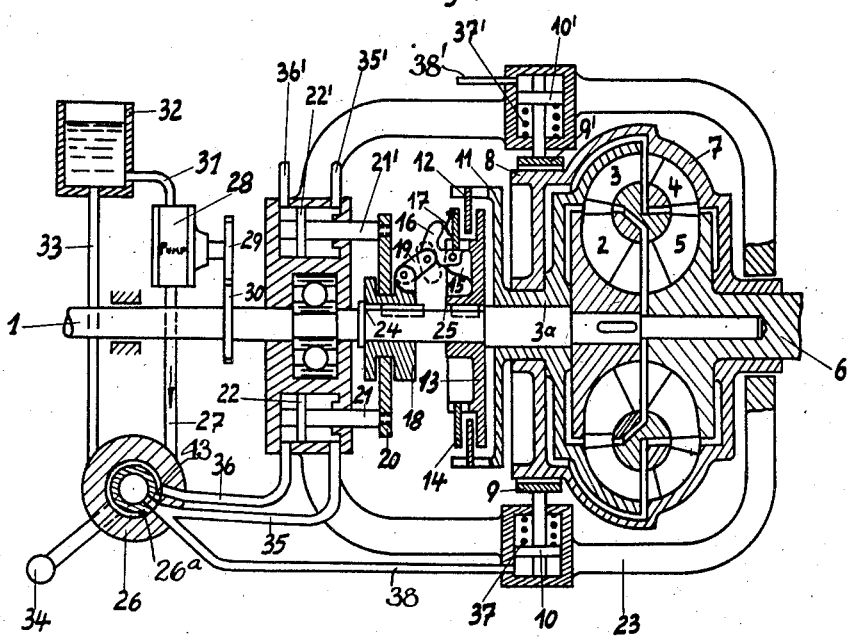

May 29, 1934.　　P. F. A. KÖCHLING　　1,960,705
FLUID CHANGE GEAR

Original Filed Sept. 29, 1930

Inventor

Paul Ferdinand
Anton Köchling.

Patented May 29, 1934

1,960,705

UNITED STATES PATENT OFFICE 1,960,705

FLUID CHANGE GEAR

Paul Ferdinand Anton Köchling, Kiel, Germany, assignor to Heinrich Gottschalk and Wilhelm Steinkopff, Hamburg, Germany Refiled for abandoned application Serial No. 485,179, September 29, 1930. This application November 25, 1931, Serial No. 577,279½. In Germany November 21, 1927

5 Claims. (Cl. 60—54)

The invention relates to a fluid change gear with driving centrifugal pump, driven turbine and guide-blade-rim, all the blade-rims of pump, turbine and guide-rim being arranged in a closed circuit and being not axially shiftable. Further the driven turbine is adapted to be coupled to the driving shaft.

Fluid change gears of this type show the disadvantage that the guide-blade-rim, during working as pump and turbine, must naturally be stationary, i. e., may not rotate in that case, when the driven turbine is directly coupled to the driving shaft and acts like a brake making worse the degree of efficiency of the power transmission. In gears of this type hitherto known this disadvantage has been eliminated by emptying the fluid gear (pump, turbine, guide-rim and the casing including them) before cutting-in the clutch between pump and turbine, so that after coupling the air-friction at the guide-blade-rim alone could decrease the degree of efficiency. This design, however, naturally had the disadvantage that the emptying of the fluid-gear as well as the refilling of the same requires a certain time and herewith simultaneously also the change of gear. Gears of this type can consequently only be employed for such purposes in which the change of gear has not to be carried out suddenly.

In the present invention this disadvantage is removed by the guide-blade-rim being rotatably mounted upon the turbine and adapted to be stopped by a brake, thereby making it possible to stop the guide-blade-rim by the brake whilst the fluid-gear is working and to run it together with pump and turbine when the clutch is engaged, so that no relative movements whatever and consequently no losses through liquid frictions can occur inside the fluid-gear. Consequently emptying and refilling the fluid-gear is no more necessary. In such fluid change gears however a great difficulty still exists in changing the gear in a short time in order to avoid that during the changing of gear the power transmission between the driving and the driven shaft is interrupted for a longer time.

Besides it is difficult to operate the clutch for the connection of turbine and driving shaft at the same time with the necessary facility and rapidity and, furthermore, to guarantee the clutch being already disengaged at the changing over when the brake is engaged and, on the other hand, the brake for stopping the guide-rim being already disengaged when the clutch for the connection of turbine and driving shaft is being engaged and further to guarantee that the clutch disengaged cannot diminish the efficiency.

According to the invention these difficulties are overcome thereby that a fluid power produced by the driving motor operates the brake, which serves for stopping the guide-rim, and the clutch between pump and turbine by means of a control valve. The brake and clutch are not lying in the fluid as at the known constructions but in air. The timely correct working of the brake and the clutch is caused by resistances tuned to one another which are arranged in the pipes between the control valve and the power-cylinders or at the brake and clutch themselves.

The drawing represents a fluid-change-gear with hydraulic operation of the brake and clutch as an example of the object of the invention, in which, e. g., the resistance at the brake is designed as counter-spring and the resistance at the clutch as spring in connection with lever action.

Instead of the change-gear shown in the drawing the gear can also be provided with a larger number of turbines and guide-rims.

Figure 2:
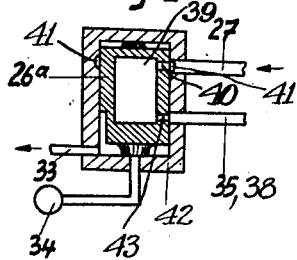

In the drawing:

Fig. 1 is an elevational view, partly in longitudinal section, of the fluid change gear; and Fig. 2 is a detail view, in section, of the control valve.

According to the Figure 1 the driving shaft 1 indirectly or directly connected to the driving engine (not shown in the drawing) is rigidly connected to a centrifugal pump 2 forming a part of a fluid circuit of known type also consisting in the driven turbine-rim 3, the guide-blade-rim 4 and the driven turbine-rim 5. The driven turbine-rims 3 and 5 are rigidly connected to one another and to the driven shaft 6. The guide-blade-rim 4 is a part of the gear casing 7 rotatably mounted on the shaft 6 and on the turbine-nave 3a and also formed as a brake-drum 8. The brake-drum 8 can be stopped by the brake-cheeks, brake-bands or brake-jaws 9, 9′ arranged in pairs opposite and being connected with the power pistons 10, 10′. A clutch-rim 11 provided with grooves is fitted to the driven turbine-rims 3 and 5. One or several segment-disks 12 glide in the grooves of the clutch-rim 11. A clutch-flange 13, also having grooves, is rigidly connected to the driving shaft 1. An inner clutch disk 14 glides in these grooves. Besides, the clutch-flange 13 is provided with three eyes being in an angle of 120° from each other of which one (15) is visible. Bent-levers 16 are pivotally mounted at these eyes which, with their cam, press against a spring 17 fastened to the inner clutch-disk 14. A clutch-sleeve 18 is shiftably arranged on the driving shaft 1 and has three eyes; guiding-rods 19 are pivoted on these eyes and at their other end on the bent-levers 16. In a groove of the clutch-sleeve 18 there is a pressure-disk 20 rigidly connected to the piston-rods 21, 21' as well as to the pistons 22, 22' the stroke of which is limited at both ends by stops in the cylinders. The pistons 10, 10' and 22, 22' move in cylinders arranged in the fixed frame 23. The clutch-sleeve 18 can be shifted axially by means of the non-rotating pressure-disk 20 and the power-pistons 22, 22' connected to it, namely between the stops 24 and 25. If the sleeve 18 is at the stop 24 (as drawn), the disk-type-clutch is disengaged, if it is at the stop 25 then it is engaged. The stops 24 and 25 as well as the stops of the pistons 22, 22' cause the sleeve 18 to rotate free of pressure about the pressure-disk 20 when the clutch is engaged or disengaged. The guiding rod 19 lies, the clutch being engaged, in the position drawn in dotted lines, the other parts accordingly. If the clutch is engaged, the driving shaft 1 is thereby directly connected to the driven shaft 6. The pressure springs 37, 37' lying in the cylinders of the pistons 10, 10' serve for lifting up the brake-cheeks 9, 9'. The cylinders of the power-pistons 10, 10' and 22, 22' are connected with a control-valve 26 by pipes, that is, valve 26 is connected to the cylinders of the pistons 10, 10' by the pipes 38, 38' and to the cylinders of pistons 22, 22' by the pipes 35, 35' and 36, 36'. A pipe 27 leads from the control-cock 26 to a pump 28 driven by means of tooth-wheels 29, 30 by the driving shaft 1. The suction pipe 31 of the pump 28 communicates with a fluid container 32 which is again connected by a pipe 33 to the control-valve 26.

In Fig. 2 the control-valve is drawn in detail. In the casing 26 is rotatably mounted the cock 26a which is continuously in communication through the pipe 27 with the pressure pump 28. The interior of the casing 26 communicates through the pipe 33 with the fluid-container 32.

When the driving shaft 1 is rotated, pump 28 feeds liquid under pressure through pipe 27 to control-organ or cock-valve 26, which is provided with a rotatable cock 26a, adapted to be rotated by its lever 34. Cock 26a is hollow and its interior chamber 39 is continuously in communication with pump 28 by means of a passage 40 in the wall of said cock opposite a circular recess 41 in body 42 of said valve, see Fig. 2. A second passage 43 in said cock permits communication of chamber 39 with pipes 35, 35', 38 or with pipes 36, 36' according to the position of cock 26a. Recesses in the wall of said cock continuously communicate through pipe 33 with fluid container 32 not under pressure, so that alignment of these recesses with pipes 36, 35 and 38 permits free discharge of fluid under pressure from the cylinders for pistons 10, 10' and 22 and 22' respectively.

The respective cylinders and piston sides, to which, at times, no pressure-fluid is carried, communicate with the fluid container 32 through the cock 26a and the pipe 33.

In order to guarantee, when changing-over from turbine-speed to direct drive, that the brake cheeks or brake-bands 9, 9' are released before the disk-clutch 11, 12, 13, 14 is engaged, the springs 37 are fitted in the cylinders for the power-pistons 10, 10' causing an immediate releasing of the brake when changing-over by the lever 34, whereas for engaging the disk-clutch a certain, although very short, time is required, because the clutch is only engaged after the power-pistons 22, 22' have been shifted towards the right. The controlling of brake and clutch in the correct sequence, when changing-over from direct to turbine drive, is caused by the fact that the fluid pressure in the pipes 35, 35' necessary for disengaging the clutch is smaller than the pressure necessary for overcoming the tension of the springs 37, 37', and that only after the clutch has been disengaged does the pressure rise sufficiently to press the brake-cheeks 9, 9' against the brake-drum 8. The action of the bent levers 16 and 19 is so dimensioned that the pressure necessary for disengaging the clutch is smaller than that required for engaging the brake. As, however, in the position of the lever 34 for turbine-speed the same pressure exists in the pipes 35, 35' and in the cylinders of the power-pistons 10, 10' and as they communicate with one another through the cock 26a, the clutch sleeve 18 is at first shifted to its end position 24, then the pressure in the pipes automatically increases and presses the brake-cheeks 9, 9' against the brake-drum 8.

The main advantage of the invention is the extremely rapid changing-over and the easy handling by a single lever 34 and further the great efficiency of the power transmission.

The above application is a refiling of my abandoned application Ser. No. 485,179, filed Sept. 29, 1930.

Obviously the invention can be carried out in different ways of which one example of embodiment has been represented in the drawing. I, therefore, do not wish to be limited to the illustrated construction, but what I broadly claim as my invention and desire to secure by Letters Patent is:

1. A fluid change-gear comprising a driving centrifugal pump connected to a driving shaft, a driven shaft, a turbine connected to said driven shaft, a guide-blade-rim rotatably mounted upon the turbine, all the blade-rims of pump, turbine and guide-rim arranged in a single closed circuit, a brake for stopping said guide-blade-rim, a clutch between driving and driven shaft with bent-lever-transmission, cylinders and pistons for operating said clutch, a fixed frame with pressure-cylinders for operating said brake and clutch, a pump for generating a power medium, a control means for distributing the power medium on the pressure-cylinders, springs and pistons in the pressure cylinders of the brake for stopping the guide-blade-rim, said springs and pistons of said brake on the one hand and the pistons for clutch and its bent-lever-transmission on the other hand being so dimensioned that the fluid pressure in the cylinders for disengaging the clutch is smaller than the pressure in cylinders for engaging the brake.

2. A fluid change-gear comprising a driving centrifugal pump connected to a driving shaft, a driven shaft, a turbine connected to said driven shaft, a guide-blade-rim rotatably mounted upon the turbine, all the blade-rims of pump, turbine and guide-rim arranged in a single closed circuit, a brake for stopping said guide-blade-rim, a clutch between driving and driven shaft with bent-lever-transmission, cylinders and pistons for operating said clutch, a fixed frame with pressure-cylinders for operating said brake and clutch, a pump for generating a power medium, a control means for distributing the power medium on the pressure-cylinders, springs and pistons, in the pressure cylinders of said brake for stopping the guide-blade-rim, said springs and pistons of said brake on the one hand and the pistons for clutch and its bent-lever-transmission on the other hand being so dimensioned that the fluid-pressure in the cylinders for disengaging the clutch is smaller than the pressure in cylinders for engaging the brake and said springs causing also automatic releasing the brake when no pressure-fluid is supplied to the corresponding cylinders.

3. A fluid change-gear comprising a driving shaft, a centrifugal pump connected to said shaft, a driven shaft, a turbine connected to said driven shaft, a guide-blade-rim rotatably mounted upon the turbine, a brake for locking said guide-blade-rim against rotation, a clutch member for directly coupling said driving shaft with said driven shaft, a plurality of stationary hydraulic means coupled with said clutch and said brake for actuation thereof and a single means controlling said hydraulic means in timed relation, all the blade rims of the pump, the turbine and the guide rim being arranged in a single closed circuit.

4. A fluid change gear comprising a frame, a driving shaft rotatably mounted in said frame, a centrifugal pump secured to said shaft, a driven shaft rotatably mounted in said frame, a turbine secured to said driven shaft, a guide-blade-rim rotatably mounted upon the turbine, a brake for locking said guide-blade-rim against rotation, shiftable clutching means between said driving and driven shaft for direct coupling of said shafts with each other, hydraulic means for shifting said clutching means, hydraulic means for actuating said brake and a single means controlling both said hydraulic means in timed relation, all the blade rims of the pump, the turbine and the guide rim being arranged in a single closed circuit.

5. A fluid change gear comprising a driving shaft, a centrifugal pump connected to said shaft, a driven shaft, a turbine connected to said driven shaft, a guide-blade-rim rotatably mounted upon the turbine, a brake for locking said guide-blade-rim against rotation, a clutch member for directly coupling said driving shaft with said driven shaft, hydraulic means for actuating said clutch member, yielding means for counteracting actuation of said clutch member, hydraulic means for actuating said brake member, yielding means for counteracting actuation of said brake member and a single operating member controlling both said hydraulic means, said means for counteracting actuation of said clutch member being of less resistance than the yielding means counteracting said actuation of said brake member to effect timed actuation of said brake member with respect to said clutch member, all the blade rims of the pump, the turbine and the guide rim being arranged in a single closed circuit.

PAUL FERDINAND ANTON KÖCHLING.